United States Patent
Neuenschwander

(10) Patent No.: US 6,530,142 B2
(45) Date of Patent: *Mar. 11, 2003

(54) DUAL ACTION INDEXING SYSTEM AND METHOD FOR A DIE ASSEMBLY

(75) Inventor: Thomas R. Neuenschwander, Fort Wayne, IN (US)

(73) Assignee: L. H. Carbide Corporation, Fort Wayne, IN (US)

( * ) Notice: Subject to any disclaimer, the term of this patent is extended or adjusted under 35 U.S.C. 154(b) by 98 days.

This patent is subject to a terminal disclaimer.

(21) Appl. No.: 09/754,657

(22) Filed: Jan. 4, 2001

(65) Prior Publication Data

US 2001/0006597 A1 Jul. 5, 2001

Related U.S. Application Data

(63) Continuation-in-part of application No. 09/220,718, filed on Dec. 24, 1998, now Pat. No. 6,192,575, which is a continuation-in-part of application No. 08/759,478, filed on Dec. 5, 1996, now Pat. No. 5,881,450.

(51) Int. Cl.[7] ................................................. H01F 7/06
(52) U.S. Cl. .............................. 29/609; 29/598; 29/596; 29/732; 29/736
(58) Field of Search ........................... 29/732, 736, 738, 29/596, 609, 598

(56) References Cited

U.S. PATENT DOCUMENTS

| | | | |
|---|---|---|---|
| 3,203,077 A | 8/1965 | Zimmerle | 29/598 |
| 4,597,168 A | 7/1986 | Oboshi et al. | 29/596 |
| 4,615,207 A | 10/1986 | Oboshi et al. | 72/404 |
| 4,619,028 A | 10/1986 | Neuenschwander | 29/33 |
| 4,640,166 A | 2/1987 | Mizukado et al. | 83/552 |
| 4,704,184 A | 11/1987 | Oboshi | 156/512 |
| 4,711,009 A * | 12/1987 | Cornelison et al. | 29/527.4 |
| 4,723,360 A | 2/1988 | Endo | 29/732 |
| 4,738,020 A | 4/1988 | Neuenschwander | 29/598 |
| 4,832,658 A | 5/1989 | Hendershot et al. | 464/160 |
| 4,897,916 A | 2/1990 | Blackburn | 29/609 |
| 5,087,849 A | 2/1992 | Neuenschwander | 310/216 |
| 5,123,155 A | 6/1992 | Neuenschwander | 29/596 |
| 5,163,217 A | 11/1992 | Sakanishi | 29/564 |
| 5,377,115 A | 12/1994 | Neuenschwander | 364/486 |
| 5,613,919 A | 3/1997 | Nelson | 475/7 |
| 5,881,450 A * | 3/1999 | Neuenschwander | 29/596 |
| 6,192,575 B1 * | 2/2001 | Neuenschwander | 29/596 |

* cited by examiner

Primary Examiner—Charles G. Freay
Assistant Examiner—Emmanuel Sayoc
(74) Attorney, Agent, or Firm—Baker & Daniels

(57) ABSTRACT

An indexing system for a die assembly for manufacturing a stack of laminae from sheet stock material in a punch press, the stack having a desired stack height and a skew angle, the stock material having a nominal thickness. The indexing system includes indexing means for producing a first indexing input movement in response to movement of the punch press, a motor for producing a second indexing input movement in response to a control signal, and differential means for combining the first and second indexing input movements into an indexing output movement and having first and second input means for respectively receiving the first and second indexing input movements. The first input means is coupled to the indexing means, and the second input means is coupled to the motor. The differential means also has output means for transmitting the indexing output movement; a rotatable choke barrel in which laminae are received and stacked. The choke barrel is rotationally coupled to the output means, and is rotated in accordance with the indexing output movement. Cyclical inertial loads imparted by the choke barrel are absorbed within the motor.

20 Claims, 8 Drawing Sheets

DUAL ACTION INDEXING SYSTEM AND METHOD FOR A DIE ASSEMBLY

This is a continuation-in-part of U.S. patent application Ser. No. 09/220,718, filed Dec. 24, 1998 (now U.S. Pat. No. 6,192,575), which is a continuation-in-part of U.S. patent application Ser. No. 08/759,478, filed Dec. 5, 1996 (now U.S. Pat. No. 5,881,450).

BACKGROUND OF THE INVENTION

The present invention relates generally to laminated parts for use in electric motors and generators. More particularly, the present invention relates to electric motor or generator stators and rotors having stacked laminae and the methods and machines, i.e., progressive dies and controllers therefor, used in the manufacture of such laminated parts.

The manufacture of stators and rotors employing stacked laminae is well known in the art. Typically, the laminae are blanked from continuous strip stock and then stacked and bound together to form the stator or rotor. Progressive die assemblies for producing stator or rotor laminations wherein a strip of lamination material is fed through a sequence of punching steps to progressively form the laminae are also well known.

Rotor laminae generally include a plurality of skewed conductor slots which are formed around the periphery of the rotor stack in arcuately spaced relation to one another by rotationally indexing the laminae with respect to the rotor stack axis. Indexing involves rotating the rotor stack and the last produced lamina relative to each other by a predetermined rotational increment so that, when the laminae are combined in a stack, the rotor conductor bar slots defined by adjacent conductor slots are skewed or slanted relative to the stack axis. Stator stacks, on the other hand, include winding slots around the inner periphery of the stack which extend parallel to the stack axis, without skew, and are shaped to receive the stator windings. Although relatively rare, inside-out motors are often used in fan motor designs and utilize inner cores manufactured with straight slots to be used with outer cores having skewed slots, in which case it would be the outer core laminations which are rotated relative to each other to produce the skew angle.

In addition to producing a skew angle, as discussed above, the relative rotation of a lamina and the lamina stack onto which the lamina will be placed can be used to overcome the negative effects created by thickness inconsistencies in the strip stock from which the laminae are blanked. The strip stock used to manufacture lamina stacks may have thickness inconsistencies wherein one side of the strip stock is thicker than the other side. If laminae punched from the strip stock are stacked without rotation, the lamination stack produced will not have a uniform height around its entire perimeter because the stacking of the individual laminae will additively compound the thickness inconsistencies present in the strip stock on one side of the stack. A stack having a substantially uniform height can be produced, however, by rotating individual laminae relative to the lamina stack to equally distribute the thickness inconsistencies about the stack axis. The inconsistencies thereby cancel each other out in a known process often referred to as gamma correction.

In response to these problems, an autorotation system to compensate for nonuniform stock thickness was developed which both rotates and interlocks the stacked laminae. This system compensates for variations in lamina thickness while properly skewing the conductor slots of rotor laminae, as described in U.S. Pat. Nos. 4,619,028; 4,738,020; 5,087,849 and 5,123,155, all assigned to the assignee of the present invention and the disclosures of which are expressly incorporated herein by reference. In the systems disclosed in the aforementioned patents, the choke barrel holding the lamination stack is automatically rotated before each lamina is blanked from the strip stock and the lamina's circumferentially disposed tabs are interlocked with the slots of the uppermost lamina of the incomplete lamination stack within the barrel.

In the apparatus and method disclosed in the aforementioned patents, the individual laminae are typically rotated through an angle which is the sum of 180° to provide for gamma correction plus a smaller incremental amount necessary to provide the proper skew angle. Although the laminae may be rotated through other angles, the angle, without including the incremental rotation necessary to produce the skew angle, must be at least 360°/(number of interlock tabs) to permit the use of interlocking tabs and slots.

The use of an AC or DC servomotor and a controller allows the operator of the die assembly to rapidly and easily alter the rotational amounts to produce different skew angles or to alter the angle through which the laminae are rotated to correct for thickness inconsistencies. The controller computes a single angle through which the choke barrel must be rotated to provide for both gamma correction and a proper skew angle. The use of a servometor to rotate a choke barrel for such purposes, however, places a limit on the number of strokes per minute of the die assembly because it requires the use of a relatively large, and relatively slow, servo drive unit which has the capacity to handle the inertial loads involved in rotating the choke barrel through such large angles between each stroke of the die assembly as well as to be sufficiently accurate. Typical achievable rates are 275 to 300 strokes/minute. Notably, the life of the servomotor in such a system is not particularly long; in addition to providing the desired skew angle, the motor must also provide the necessary gamma correction. A faster indexing system, which also extends servomotor life, is desirable.

Mechanical indexers which utilize a camming assembly such as a roller cam to provide indexed rotational movements to rotate the choke barrel are also known and may be used to provide for gamma correction while allowing the die assembly to operate at significantly higher rates, e.g., in the range of 400 to 500 strokes/minute, than a comparable servo drive assembly. Indexers of the type used for rotating choke barrels in stamping die apparatuses are manufactured by the Ferguson Company, 11820 Lackland Road, St. Louis, Mo. 67146. Mechanical indexers used for gamma correction lack the flexibility of servo drive systems, however, since the angle at which they rotate the choke barrel cannot be easily adjusted.

A mechanical system has also been developed to provide for the incremental indexing of laminae to provide a proper skew angle and U.S. Pat. No. 3,203,077 provides one example. Although such a mechanical system provides for some adjustment of the amount of rotational indexing necessary for a skew angle, the adjustment of mechanical indexing systems is not as flexible or convenient as the adjustment of a servo drive motor which is regulated by a controller.

A system which utilizes a modified roller cam assembly to provide a mechanical indexer in conjunction with a system for providing an incremental rotational movement for producing a skew angle is disclosed by U.S. Pat. No. 5,163,217. The disclosed system, however, cannot employ a standard "off the shelf" roller cam assembly thereby increasing the cost of the system. The disclosed system also employs a plurality of small rollers which are in frictional contact between an input roller and an output disk. The use of such frictionally engaged surfaces to transmit rotational movements is more subject to slippage than an arrangement involving the transfer of rotational movement by positively locking gear teeth.

A system which utilizes a differential device having an output shaft which is coupled to the rotary choke barrel of a die stamping apparatus, an input shaft which is driven by a mechanical indexer to impart gamma correction with each press cycle, and a housing or casing incrementally rotated by a servomotor to impart a fixed amount of skew angle with each press cycle, is disclosed in U.S. Pat. No. 4,615,207. The differential device thus serves as a phase adjuster which combines the gamma correction and the skew angle. A rotary cam switch is attached to the press crank and, with each cycle of the press, provides a timing signal to a control circuit which actuates the servomotor, causing it to rotate through a small, fixed angle. The output shaft of the servomotor is provided with a worm gear which is enmeshed with a ring gear provided on the rotatable differential housing or casing. Thus, in addition to being rotated through the index angle (e.g., 180°) for gamma correction by the input shaft and internal gearing of the differential device, the out put shaft of the differential device is additionally rotated through the skew angle, via rotation of the differential casing by the servomotor through the worm gearing.

Worm gearing is used for obtaining large speed reductions between nonintersecting shafts making an angle of 90° with each other. Generally, the lead angle of the helical worm gear thread is rather shallow, and the surfaces along which the worm gear and ring gear interface lie substantially in planes which are almost normal to the longitudinal axis of the worm gear; i.e., a plane normal to the worm gear axis would form a very small angle relative to the planes in which the worm gear and ring gear interfaces lie. In any given angular ring gear position, a tooth of the ring gear is captured between adjacent worm gear thread portions, linearly in the direction of the worm gear's longitudinal axis. The direct mechanical link between a worm gear thread and a ring gear tooth counteracts and absorbs the inertial forces exerted by the choke barrel at the beginning and end of each indexing cycle.

It is typical in worm gearing applications that rotation of the (driving) worm gear by the intermeshed (driven) ring gear is prevented by the nearly normal angle of their interface relative to the worm gear's axis of rotation. Thus, in phase adjusters utilizing a worm gear/ring gear arrangement for imparting a skew angle, it is the interface between the worm and ring gears which holds the position of the differential casing, and thus absorbs the reversing inertial loads imparted by the rotating choke barrel and differential.

A problem encountered with differential type phase adjusters of the type disclosed in U.S. Pat. No. 4,615,207, stems from the worm gear/ring gear interface being subjected to the reversing inertial load imparted thereon by the rotating choke barrel. This problem is particularly severe at high indexing rotation frequencies (e.g., 400 to 500 times per minute) and may lead to premature failure of the phase adjuster.

For example, a Model DIFF30 differential unit produced by the Candy Manufacturing Company of Niles, Ill., of the type disclosed in U.S. Pat. No. 4,615,207, was used as the phase adjuster in a die assembly and subjected to reversing inertial loads by the rotating choke barrel at a rate of 400 to 500 times per minute. That differential unit failed completely within about 20 minutes. Thus, at these press cycle rates, the projected life of this unit is only about 8000 to 10,000 press cycles, and it would likely be practically inoperable long before due to unacceptable backlash between the worm gear and ring gear.

A Model B-50ZMV-10 differential unit, manufactured by Wedgetrac Corporation of Rockford, Ill., is of zero velocity gear mesh type disclosed in U.S. Pat. No. 5,613,919, the disclosure of which is expressly incorporated herein by reference. This differential unit also uses a worm gear/ring gear arrangement, and was substituted for the above Candy Model DIFF30 differential unit. Although the Wedgetrac Model B-50ZMV-10 differential unit lasted approximately 20 hours (i.e., approximately 480,000 to 600,000 press cycles at normal operating speeds) before a backlash problem between its worm gear and ring gear developed, and thus proved substantially more durable than the Model DIFF30 unit, an even more durable means for combining the gamma correction and skew angle is needed to accommodate press cycle rates of 400 to 500 per minute in a die assembly apparatus of the type described hereinbelow.

It appears that the direct interface between the worm gear and the ring gear is the weak link in previous phase adjusters. With respect to the failed Model DIFF30 and Model B-50ZMV-10 differential units described above, it is believed that, because the substantial, reversing inertia forces associated with quickly starting and stopping the choke barrel and differential device are exerted on and between the abutting, mating worm and worm gear surfaces at angles which are almost normal to those surfaces, the worm and worm gear cannot accommodate the repeated inertial shocks delivered through the differential casing by the rotating choke. Rather than being glanced along the worm and/or worm gear tooth surfaces, the entirety of these forces are imposed thereon at angles which are nearly normal thereto, and must be directly absorbed by the worm/worm gear interface. As indexing is initiated, the inertial load of the choke barrel and differential device is imparted first on one pair of interfacing worm thread portion/worm gear tooth surfaces, located on one side of the worm gear tooth; as indexing is completed, the inertial load reverses, and is imparted on another pair of interfacing worm thread portion/worm gear tooth surfaces, located on the opposite side of that worm gear tooth.

Notably, at an operating speed of 400 press cycles per minute, over the course of a month, a die stamping apparatus may cycle well over 6.5 million times. From the above discussion, it should be apparent that phase adjusters having worm gearing arrangements may be inadequate for achieving such high production rates. A phase adjuster which overcomes the above-described weaknesses of phase adjusters having worm gearing arrangements, and which quickly and accurately combines gamma correction and skew angle, is thus desirable.

Further, although it may be possible to employ a more robust differential unit having a worm gear/ring gear link to a servomotor which is durable enough to provide a satisfactory life expectancy, the mass of, and frictional losses within, such differentials are. expected to be quite high. Therefore a substantially greater amount of energy would be required to drive such an indexing unit. This additional energy would be drawn from the press crank, and would then not be available for powering the stamping operations of the die apparatus. Moreover, it is expected that a differential unit sufficiently large enough to prevent premature failure at the worm gear/ring gear interface would have an inertia too large to accommodate cycle speeds anywhere near 400 to 500 per minute. Therefore, a smaller, lighter differential unit is much preferred.

SUMMARY OF THE INVENTION

The present invention provides a lamination indexing system which relatively rotates individual laminations with respect to a stack of laminations using both a mechanical indexer having a conventional roller cam assembly and a servo drive unit. By using a mechanical indexer to provide the larger rotational angle necessary to correct for thickness inconsistencies, a small, fast, and accurate servo drive motor can be used to provide the rotational indexing necessary to obtain the proper skew angle. The combination of these two rotation systems is made possible by using a phase adjuster which permits the combination of the two separate rotational outputs provided by the respective systems. In particular, the phase adjuster for use in combining the two separate rotational outputs provided by the respective systems is a zero velocity gear mesh differential or a step-up ratio differential.

An advantage of the present invention is that a lamina and a lamina stack may be relatively rotated in the approximate range of 400 to 500 cycles/minute to provide for both gamma correction and the incremental indexing necessary to provide a desired skew angle which is much faster than a system employing only a large servo drive motor. The increased rate of operation is made possible because both the mechanical indexer and the small servo drive motor are faster than a large servo drive motor and the phase adjuster allows the mechanical indexer and small servo drive motor to simultaneously rotate the choke barrel.

Another advantage of the present invention is that it permits operation of the die assembly at higher rates than those obtainable with a die assembly having a large servomotor in isolation while still providing the ability to properly index the laminae to produce a desired skew angle.

Yet another advantage of the present invention is that it permits operation of the die assembly at higher rates than those obtainable with a die assembly having a large servomotor while still providing the ability to rapidly and conveniently alter the skew angle.

A still further advantage of the present invention is that the use of a zero velocity gear mesh differential provides a rugged indexing system with a long life, and also extends the life of the servomotor vis-a-vis prior indexing systems which rely on the servomotor to provide both the skew angle and gamma correction. In accordance with the present invention, the amount of work performed by the servomotor is comparatively reduced by a substantial amount, thereby extending the life of the motor.

Furthermore, the present invention provides an indexing system for a die assembly for manufacturing a stack of laminae from sheet stock material in a punch press, the stack having a desired stack height and a skew angle, the stock material having a nominal thickness. The indexing system includes indexing means for producing a first indexing input movement in response to movement of the punch press, a motor for producing a second indexing input movement in response to a control signal, and differential means for combining the first and second indexing input movements into an indexing output movement and having first and second input means for respectively receiving the first and second indexing input movements. The first input means is coupled to the indexing means, and the second input means is coupled to the motor. The differential means also has output means for transmitting the indexing output movement; a rotatable choke barrel in which laminae are received and stacked. The choke barrel is rotationally coupled to the output means, and is rotated in accordance with the indexing output movement. Cyclical inertial loads imparted by the choke barrel are absorbed within the motor.

Thus, an even more durable phase adjuster is provided which overcomes the weaknesses of some prior indexing systems which employ worm gearing to hold the choke barrel at the desired punching orientation and impart the phase angle thereto. This embodiment of the present invention does not rely on worm gearing to impart the skew angle, or to absorb the reversing inertial load imparted by the rotating choke barrel. According to this embodiment of the present invention, the reversing inertial loads imparted by the rotating choke barrel are absorbed by the motor. One example of this embodiment of the present invention has an anticipated life of approximately 20,000 hours. At 400 press cycles per minute, this life is estimated at approximately 480 million cycles. At 6.5 million cycles per month at 400 press cycles per minute, it is estimated that this particular embodiment of the present invention will be greater than six years.

The present invention also provides an indexing system for a die assembly for manufacturing a stack of laminae from sheet stock material in a punch press, the stack having a desired stack height and a skew angle, the stock material having a nominal thickness. The inventive indexing system includes an indexer including a rotatable output member having a movement which corresponds to movement of the punch press, a motor including a rotatable output member having a movement which is made in response to a control signal, and a differential having first and second rotatable input members and a rotatable output member, the rotational movement of the differential first and second rotatable input members being combined by the differential into the rotational movement of the differential output member. The indexer output member is coupled to the differential first input member, and the motor output member being coupled to the differential second input member. The inventive indexing system includes a rotatable choke barrel in which laminae are received and stacked, the choke barrel being rotatably coupled to the differential rotatable output member, whereby rotation of the differential output member causes the choke barrel to rotate, and wherein inertial loading by the choke barrel on the differential second input member is transmitted to, and absorbed by, the motor.

Further, the present invention also provides a method of indexing a rotatable choke barrel, in which laminae punched from sheet stock material are received and stacked, with a differential having rotatable first and second input members and a rotatable output member which is coupled to the choke barrel, whereby the choke barrel is rotated by the differential output member. The inventive methods includes: rotating the differential first input member through a first angle; rotating the differential second input member through a second angle; combining the rotations of the differential first and second input members into a rotation of the differential output member through a third angle; rotating the choke barrel between first and second angular positions; and resiliently absorbing at least a portion of the rotational inertia of the choke barrel imparted on the differential as the choke barrel respectively leaves and reaches its first and second angular positions.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
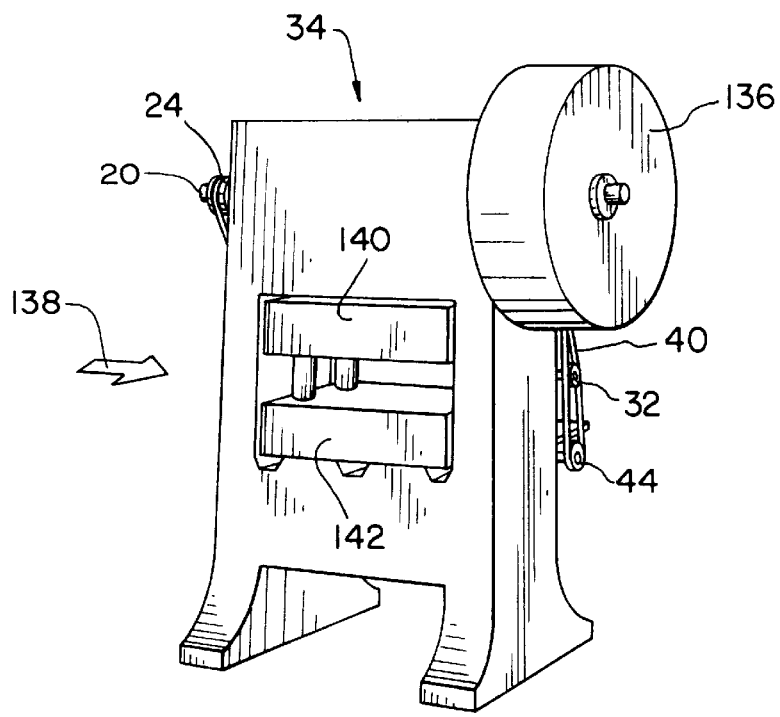
FIG. 1 is a schematic perspective view of a punch press assembly.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PRESENT INVENTION

The embodiments disclosed below are not intended to be exhaustive or limit the invention to the precise forms disclosed in the following detailed description.

A die assembly or punch press 34 is shown in FIG. 1. A sheet of stock material is fed in the direction of arrow 138 between upper die block 140 and lower die block 142. As the sheet stock progresses through the die assembly 34 lamina features are sequentially stamped at different punching stations to thereby form laminae. At one station, a rotatable choke barrel receives the laminae as they are punched free of the strip stock material. The punches used to stamp the laminae are attached to upper die block 140 which is vertically reciprocated. Press crankshaft 20 transmits the power necessary to reciprocate upper die block 140 and has a flywheel disposed within flywheel housing 136 at one end and a first timing sprocket 24 located at an opposite end.

Figure 2:
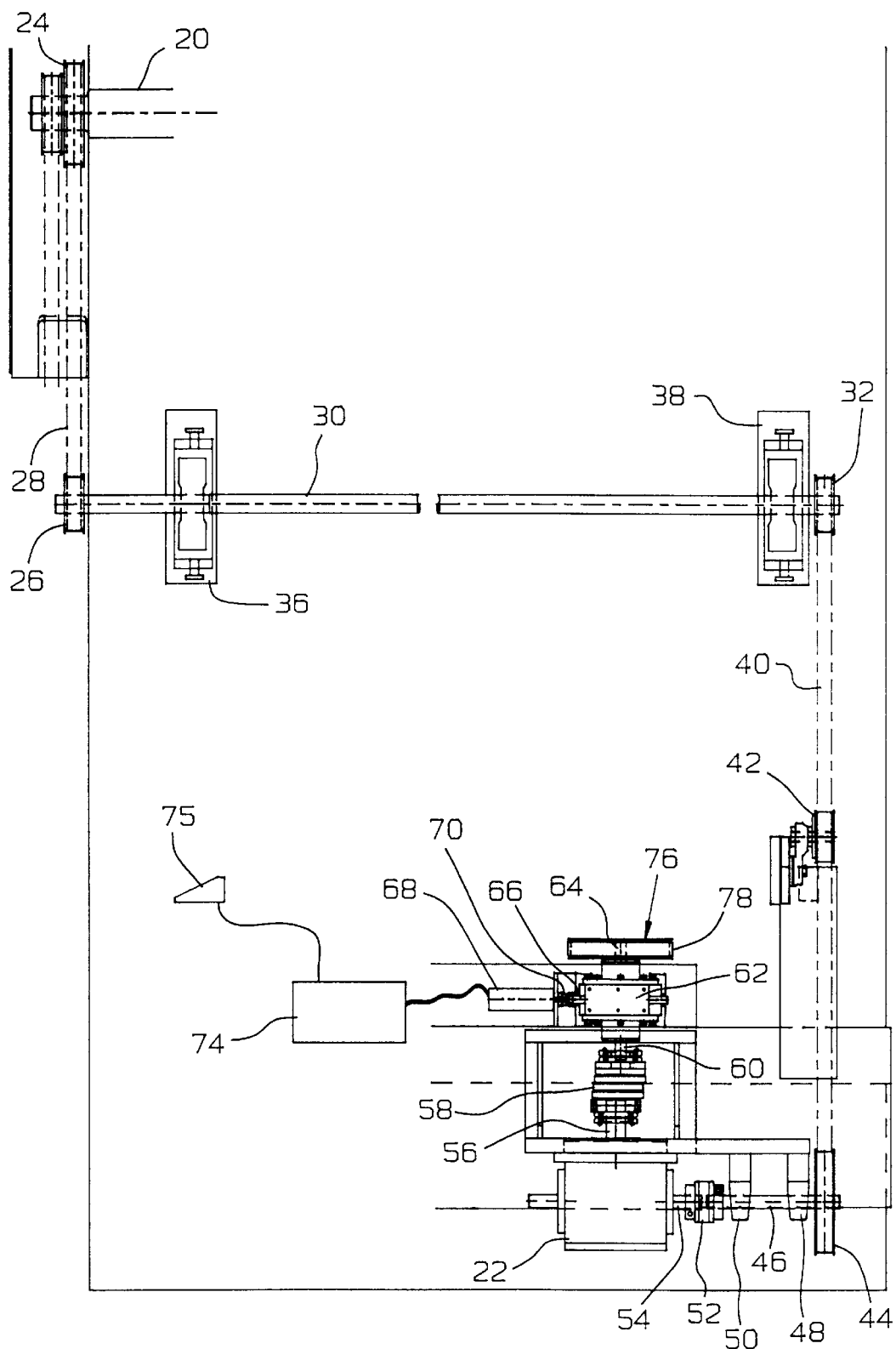
FIG. 2 is a front elevational view of a dual action indexing system.
Figure 3:
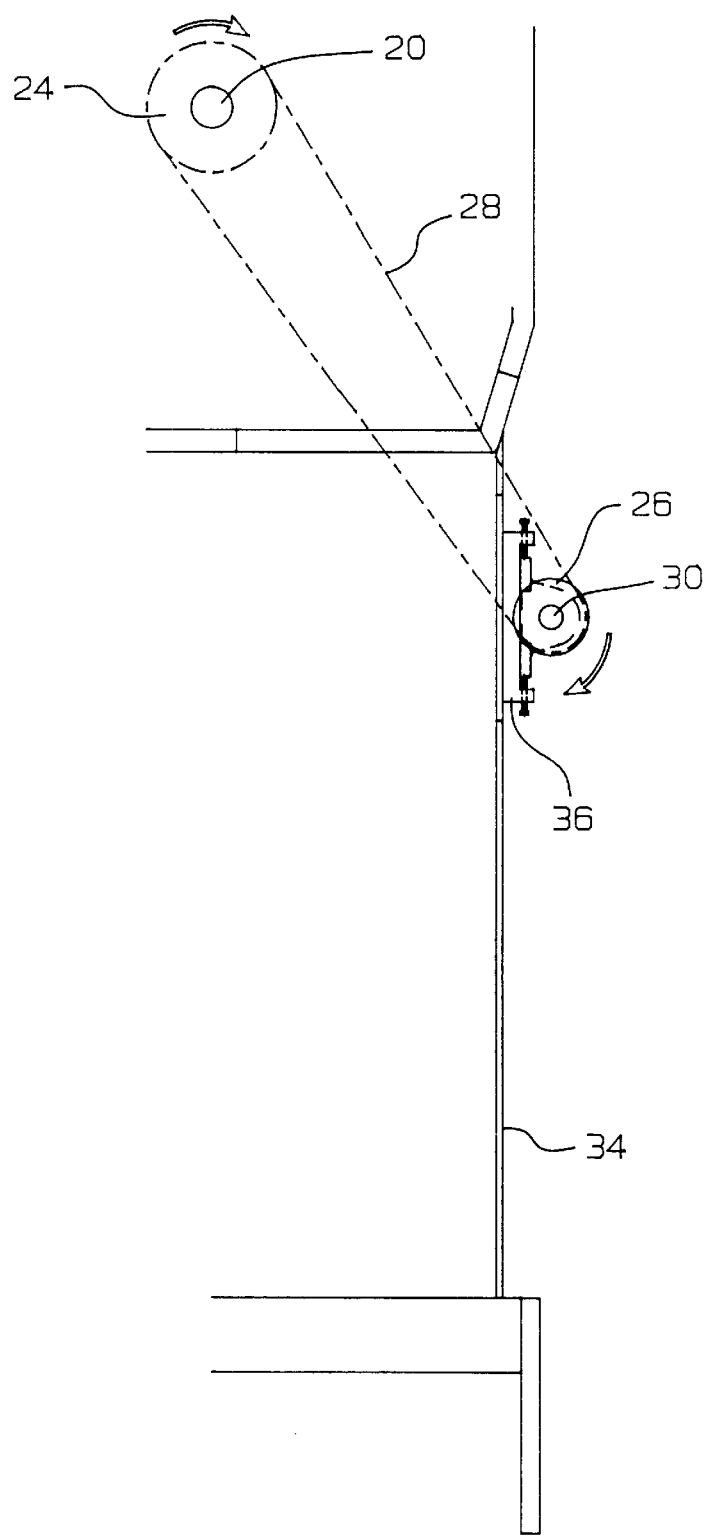
FIG. 3 is a side elevational view of a power takeoff for the dual action indexing system.
Figure 4:
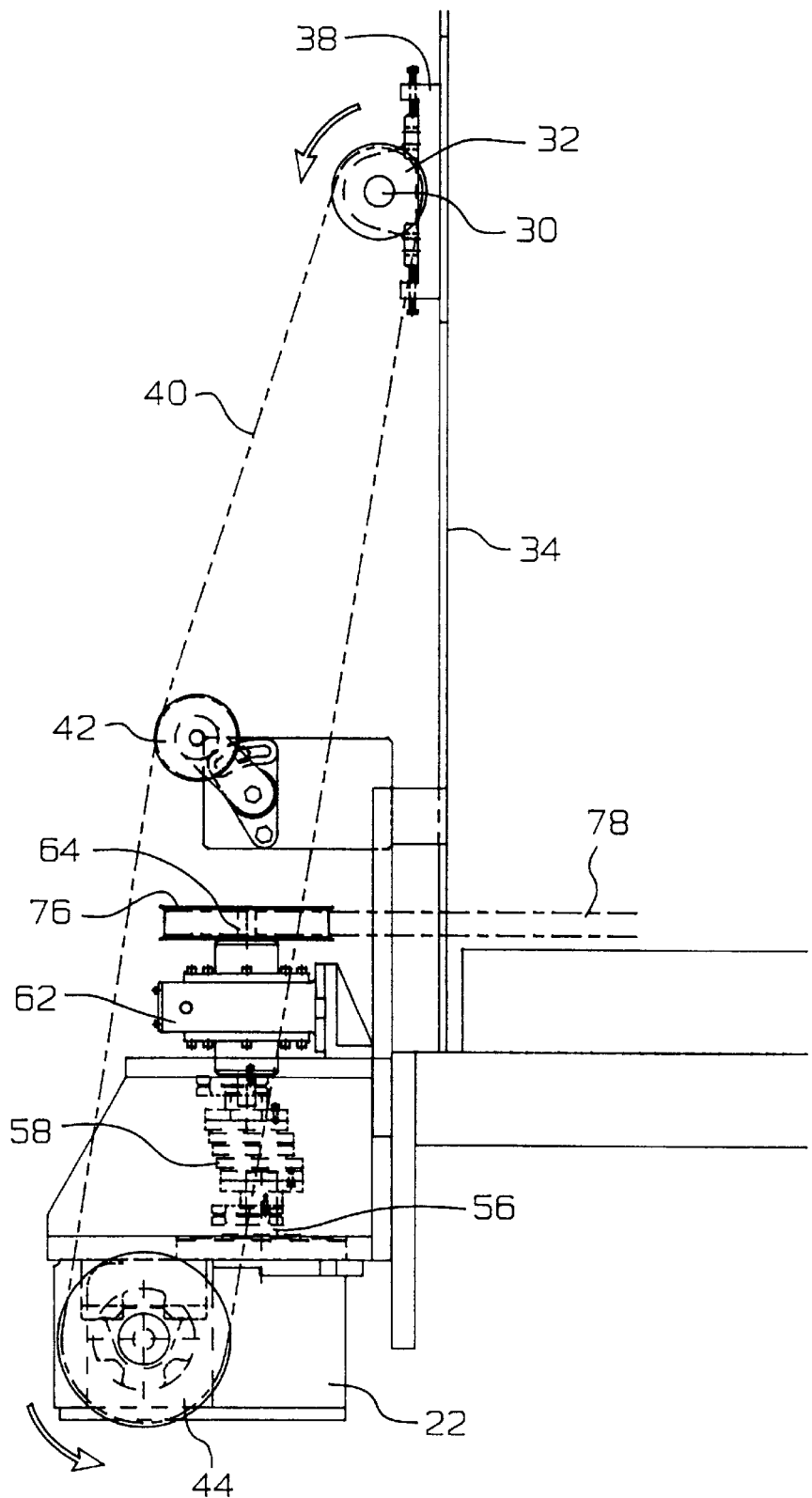
FIG. 4 is a side elevational view of the dual action indexing system.

As can be seen in FIGS. 2 and 3, a series of timing sprockets and shafts are used to transfer power from the crankshaft 20 of the punch press or die assembly to mechanical indexing drive 22. A first timing sprocket 24 is attached to crankshaft 20 and transfers power to second timing sprocket 26 via first endless timing belt 28. Second timing sprocket 26 rotates first jack shaft 30 which has a third timing sprocket 32 located opposite second timing sprocket 26. First jack shaft 30 is attached to the die assembly 34 with first and second pillow blocks, 36 and 38, respectively. The power takeoff from the press crankshaft 20 could also occur on the side of the die assembly 34 at which third timing sprocket 32 is located to avoid the use of first jack shaft 30. Use of a first jack shaft 30 can be advantageous for some die assemblies 34 when it is desirable to avoid taking power from the end of the press crankshaft 20 which has a flywheel attached thereto.

Power is transferred from third timing sprocket 32 via second endless timing belt 40. Second timing belt 40 is kept properly tensioned with idler pulley 42 and transfers power to fourth timing sprocket 44. Fourth timing sprocket 44 rotates second jack shaft 46 which is supported by third and fourth pillow blocks, 48 and 50, respectively. First coupling 52 attaches second jack shaft 46 to the input shaft 54 of the indexing drive 22. The timing sprockets 24, 26, 32 and 44 are sized to provide the proper final drive ratio between the press crank shaft 20 and the indexing drive 22. Indexing drive 22 has an internal camming assembly which transforms the substantially constant rotational input of input shaft 54 into indexed rotational movements of 180° which are separated by dwell periods. The indexed rotational movements are transmitted by output shaft 56.

The operation of indexing drive 22 is conventional and well known. Such indexing drives are available for different amounts of rotational movement between each dwell period. Indexing drives dwell and index in a repetitive, alternating pattern of dwell, index, dwell, index, . . . etc. During the "dwell" periods the output shaft is at rest and during the "indexing" periods the output shaft is rotated a predetermined amount which is dependent upon the design of the camming assembly of the indexing drive. One full cycle, i.e., one dwell and one index period, typically requires one full turn of the input shaft.

Figure 9:
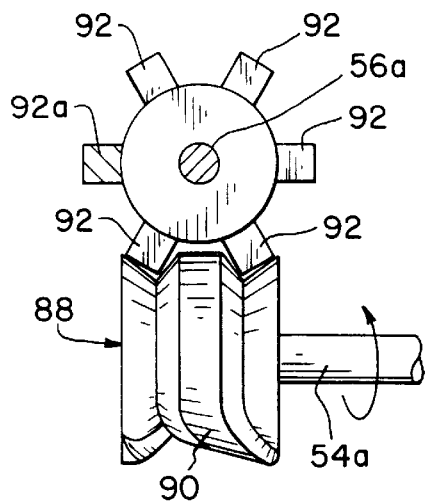
FIG. 9 is a schematic representation of a roller cam in a dwell period.
Figure 10:
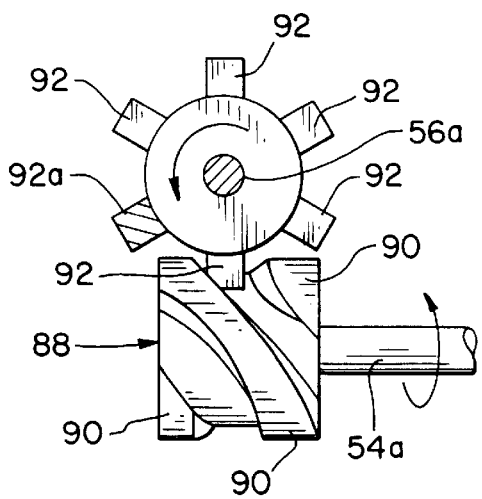
FIG. 10 is a schematic representation of a roller cam in an indexing period.

The operation of a roller cam assembly is illustrated in FIGS. 9 and 10. Input shaft 54a is rotated at a constant rate due to the action of roller gear cam 88 and cam followers 92. FIG. 9 shows the roller cam assembly during a dwell cycle. During the dwell cycle the input shaft 54a rotates but the output shaft 56a is at rest since camming rib 90 maintains cam followers 92 in a stationary position. FIG. 10 illustrates the indexing cycle of the roller gear assembly. As the roller gear cam is rotated further from the position shown in FIG. 9, the configuration of camming ribs 90 are altered and camming rib 90 causes the movement of cam followers 92.

Mechanical indexers employed in die assemblies typically rotate through an angle of either 60°, 90°, 120° or 180° during each cycle. It is also possible, however, to employ indexing drives with other angles of rotation. Sankyo America, Inc., 10655 State Route 47, P.O. Box 4338, Sidney, Ohio 45365 supplies a line of indexing drives under the brand name Sandex, including shaft type models having an indexing rotation period of 180° and which can be used as mechanical indexing drive 22 in the illustrated embodiment.

When a mechanical indexing drive 22 having an indexing rotation period of 180° is used, the indexing drive output shaft 56 is repetitively, cyclically rotated in index periods of 180° separated by motionless dwell periods as described above. The timing sprockets 24, 26, 32 and 44 are designed to rotate the input shaft 54 of the indexing drive in coordination with the operation of the die assembly whereby the die assembly will perform punching operations during the dwell periods. Thus, the mechanical indexer output shaft 56 will be at rest during the time in which a lamina is punched free of the strip stock and pushed into choke barrel 80.

Figure 14A:
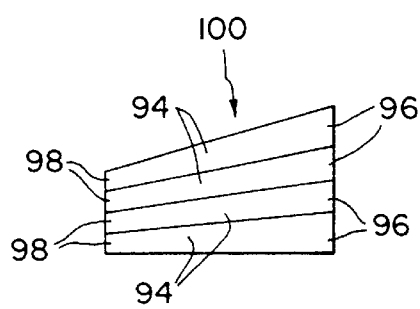
FIG. 14A is a schematic elevation of a lamina stack having a nonuniform height.
Figure 14B:
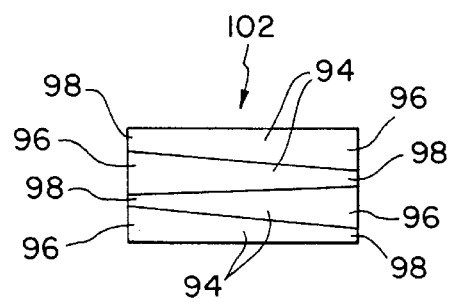
FIG. 14B is a schematic elevation of a lamina stack having a substantially uniform height.

The rotational output of the mechanical indexing drive 22 is used to rotate a choke barrel through an angle of 180° to thereby relatively rotate sequentially stacked laminae by 180° and correct for thickness inconsistencies in the strip stock material. FIG. 14A shows schematically, and at an exaggerated scale, how thickness inconsistencies in the strip stock material can be compounded when individual laminae are stacked. Each individual lamina 94 has a thicker edge 96 and a thinner edge 98 so that when the laminae are stacked without rotation a lamina stack 100 having a nonuniform height results. FIG. 14B illustrates how relatively rotating each of the individual laminae by 180° can correct for the thickness inconsistencies of the strip stock material and provide a lamina stack 102 having a substantially uniform height. It is also possible to relatively rotate each of the laminae by other angles, provided that the thickness inconsistencies are equally distributed about the stack axis.

Figure 7:
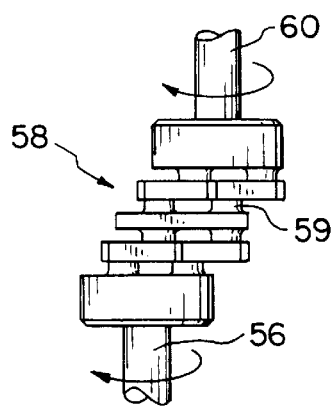
FIG. 7 is an elevational view of a Schmidt coupling.
Figure 8:
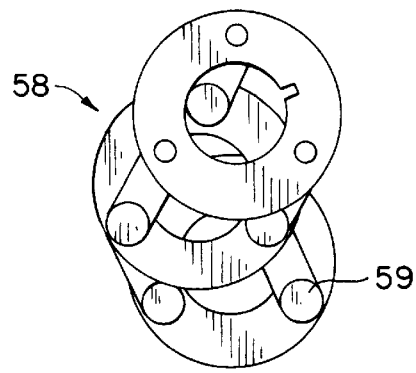
FIG. 8 is a plan view of a Schmidt coupling.

A Schmidt coupling 58 connects the output shaft 56 of the indexing drive to the input shaft 60 of the phase adjuster 62. As can be seen in FIGS. 7 and 8, Schmidt coupling 58 permits the transmission of rotational movement between parallel but slightly offset shafts 60 and 62 through a plurality of linkages 59 in a well known manner. Zero-Max/Helland, Motion Control Products, 13200 Sixth Avenue North, Minneapolis, Minn. 55441-5509 supplies a variety of Schmidt couplings including models which permit the coupling of parallel but misaligned shafts and which are suitable for use as Schmidt coupling 58 in the illustrated embodiment. The Schmidt coupling 58 transmits the indexed rotation of output shaft 56 to the phase adjuster input shaft 60.

The phase adjuster 62 also has an output shaft 64 and control shaft 66. A second coupling 70 is used to couple the output shaft 72 of servo drive motor 68 to the control shaft 66 to thereby rotate control shaft 66. The operation of the servo drive motor 68 is in turn regulated by programmable controller 74, about which more is disclosed hereinbelow.

Figure 11:
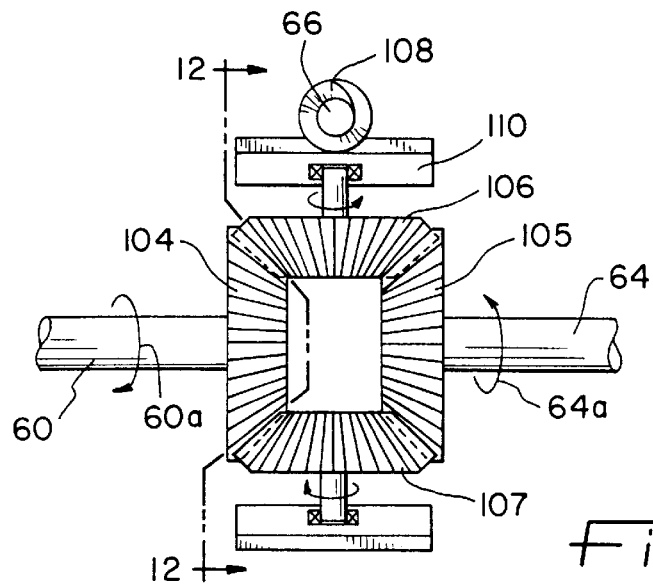
FIG. 11 is a schematic view of a phase adjuster.
Figure 12:
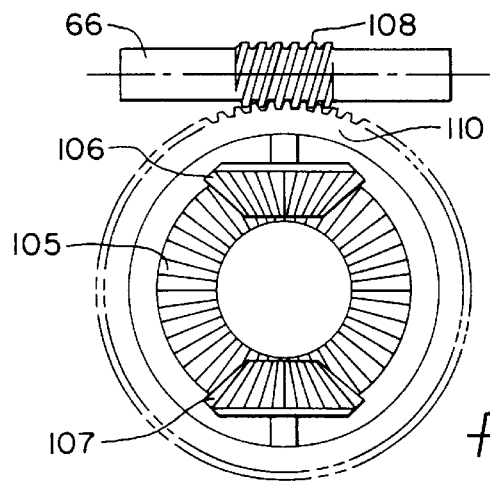
FIG. 12 is a schematic cross sectional view of the phase adjuster of FIG. 11 taken along line 12—12 of FIG. 11.

The rotation of phase adjuster output shaft 64 can be either advanced or retarded with respect to the rotation of phase adjuster input shaft 60 by means of control shaft 66. The manner in which the rotational inputs of input shaft 60 and control shaft 66 are combined is schematically illustrated in FIGS. 11 and 12. The rotation of the input shaft 60 is transferred to output shaft 64 by the interaction of a plurality of bevel gears 104, 105, 106, 107. The bevel gears 104, 105, 106, 107 also reverse the rotational movement of input shaft 60, designated by arrow 60a, during transmission of rotational movement to output shaft 64 which rotates in the direction of arrow 64a, i.e. shaft 64 rotates in the opposite direction of shaft 60. Control shaft 66 includes a worm gear 108 which engages ring gear 110. Bevel gears 106, 107 are rotaiably mounted on the interior of ring gear 110 and rotate with ring gear 110 about the common axis of shafts 60, 64 when worm gear 108 is rotated. Rotation of the ring gear 108 can be in either direction and can, therefore, cause the rotation of shaft 64 in either direction. The rotation of ring gear 110 and input shaft 60 can occur simultaneously and both of these rotational movements will be combined to produce a single rotational movement of output shaft 64 which is the sum or difference of the rotational movements. Thus, rotation of control shaft 66 can be used to either increase or decrease the rotational movement of output shaft 64 relative to input shaft 60.

Figure 13:
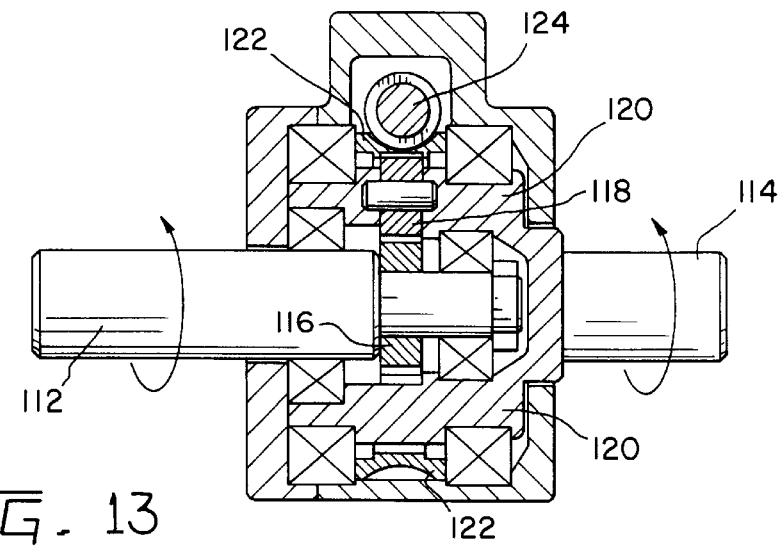
FIG. 13 is a schematic cross sectional view of a second phase adjuster.

An alternative gearing arrangement for combining the rotational movements of two input shafts into a single rotational movement is schematically illustrated in FIG. 13. The phase adjuster shown in FIG. 13 uses a planetary gear arrangement in which the rotational directions of the major input shaft 112 and the output shaft 114 are not opposed. A sun gear 116 is located on the input shaft 112 which intermeshes with planet gears 118 disposed on a planet carrier 120 rotatably fixed to the output shaft 114. Rotation of the sun gear 116 causes the planet gears 118, and planet carrier 120 to orbit the sun gear 116 in the same rotational direction as the sun gear 116 is rotated. The movement of the planet carrier 120 can be either advanced or retarded by the rotation of a ring gear 122 which surrounds and engages the planet gears 118 and is also engaged on its exterior circumference by worm gear 124. Worm gear 124 is used to control the movement of ring gear and the worm gear 124 may be, in turn, coupled to a control shaft. Thus, the rotational movements of the input shaft 112 and the control shaft, i.e., worm gear 124, are combined and transmitted via the output shaft 114.

Both of the phase adjuster embodiments discussed above use positively engaging gears to transfer and combine the rotational movements from two input shafts to a single output shaft. Thus, no slippage exists in the transmission of the rotational movements and, by the use of precision gears, backlash can be minimized.

Phase adjusters are readily available and Model Number DD-5A-LS manufactured by Dynamics Manufacturing of 4401 Jackman Road, Toledo, Ohio 43612 can be used as phase adjuster 62 in the illustrated embodiment. Andantex U.S.A., Inc., 1705 Valley Road, Wanamassa, N.J. 07712, and A. Fisher, Tool and Machine Works, 5617 W. Grand Avenue, Chicago, Ill. 60639 also manufacture phase adjusters which could be used in a die assembly embodying the present invention.

It has further been found that a differential known in the prior art as a zero velocity gear mesh differential is very suitable for use as a phase adjuster for a system of the instant invention. One such differential is disclosed in U.S. Pat. No. 5,613,919. In particular, in a zero velocity gear mesh differential the power input shaft and the power output shaft are colinear. A speed control gear, including a planetary system having a control carrier and a sun gear, are connected to the output of a servo drive motor. A plurality of planet gears engage the sun gear and also engage an internal ring gear, integral with an external ring gear which is supported by the control carrier and planet gears. The external ring gear is engaged by a worm gear which is rotated by the servo drive motor. A fixed gear on the control carrier engages a fixed gear on the main carrier. By virtue of this arrangement the power gearing can handle high loads with little or no relative motion occurring between the gear teeth for the majority of the time. This permits the handling of much higher loads as it is a well known fact that gears can handle much higher loads at low mesh velocities than at high mesh velocities. The zero velocity gear mesh differential exhibits much less backlash than conventional differentials, and thus provides a more rugged indexing system with a longer life vis-a-vis indexing systems employing other types of differential units having worm gearing. The input and output shaft of the zero velocity gear mesh differential unit rotate in the same direction. As noted above, Wedgetrac Corporation manufactures such differential units.

As noted above, phase adjusters including worm gearing may experience undesirable durability characteristics under high press cycle rates due to the very high, reversing inertial loads exerted on the worm gear/ring gear interfaces as the choke barrel begins and ends its indexing rotations.

Figure 15:
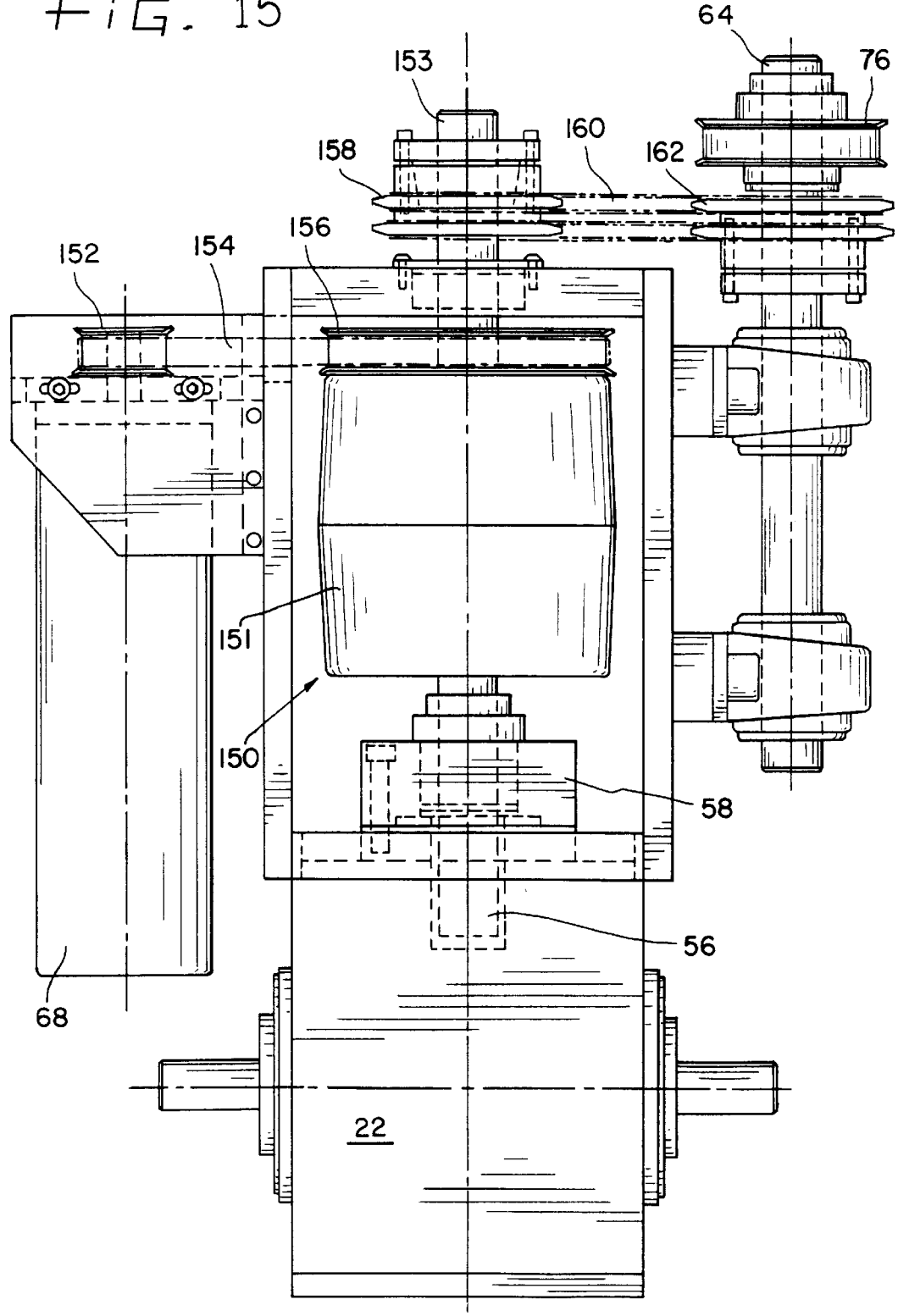
FIG. 15 is a partial plan view of an alternative embodiment of the dual action indexing system according to the present invention.

FIG. 15 illustrates another differential unit which has been found to be very suitable for use in connection with the instant invention and which addresses these durability concerns. Differential 150 is also built by Wedgetrac Corporation and is referred to thereby as the "Special High Torque, Low Inertia Differential Gearbox for L. H. Carbide," or Model No. C-LHC-01 REVB. This particular embodiment of differential 150 is designed to handle a reversing torque of 3000 pound inches, with a maximum torque reversal rate of 500 per minute.

This differential unit is axially and rotatably supported by its coaxial, vertically-oriented input and output shafts, 56 and 153, respectively. Input shaft 56 is coupled to the output of indexing drive 22. A helical input gear within the differential unit is integrally hobbed onto input shaft 56, and has 39 teeth. A helical output gear, which is axially adjacent to but not directly attached to the input gear, is integrally hobbed onto output shaft 153 and has 36 teeth. The input and output gears of the differential 150 have identical pitch diameters and are coupled by a set of three helical pinions which extend substantially the entire interior length of the differential casing 151. The helical teeth of each of these pinions intermesh with the teeth of both the input and the output gears. The pinions are rotatably and axially supported in casing 151, and revolve about the common axis of the input and output shafts as the casing is rotated.

Differential 150 has a 13:12 or 1.08333 step-up ratio between its input and output shafts 56 and 153, respectively, which slightly overdrives the output shaft relative to the input shaft. Thus, effectively the output shaft of the differential rotates 195° for each 180° of input. Output shaft 153 of differential 150 is connected to vertically-oriented output shaft 64 by means of step-down gearing comprising gear 158, endless duplex drive chain 160, and gear 162, thereby causing input shaft 56 and output shaft 64 to have a 1:1 ratio. Gear 158 has 26 teeth while gear 162 has 24 teeth. This step-down ratio takes out the overfeed factor of 1.08333 introduced by differential 150. Instead of duplex drive chain 160, an endless polychain timing belt could be used.

Rotatable casing 151 of the differential 150 is provided with an 8 mm wide, 75 tooth timing belt sprocket 156. The control ratio of the differential is 12:1, i.e., 12 revolutions of casing 151 will advance or retard output shaft 153 by 360°. Flexible, somewhat resilient, and endless timing belt 154 runs between casing sprocket 156 and sprocket 152 of servomotor 68, which is fixedly mounted relative to the stamping die apparatus. Servomotor 68 may be a Model MDD093 Indramat AC servo, which has a peak torque of 442 pound inches, a continuous torque of 142 pound inches, and is capable of repositioning its armature 500 times per minute. Alternatively, servomotor 68 may be a comparable Model FX4120 Emerson AC servo.

Sprockets 152 and 156 are sized to provide a 3:1 drive ratio through polychain timing belt 154. Therefore, since servomotor 68 is coupled to differential 150 by means of 3:1 timing belt 154, the effective ratio of the servomotor shaft through the differential to output shaft 64 is 36:1. Thus a 36° change in servomotor shaft angle produces a 1° incremental skew angle change.

Rather than relying on the worm gear/ring gear interface to absorb the reversing inertia load of the choke barrel, in the phase adjuster or dual action indexing system of FIG. 15 these shocks are absorbed by the servomotor, which acts as an electromagnetic brake, and to some degree, flexible, somewhat resilient timing belt 154. The angular position of casing 151 is held or moved by belt 154 and the electromagnetic force of motor 68, which also serves to resiliently absorb and cushion the cyclical inertial load imparted by the rotating choke barrel and differential unit.

The projected life of the dual action indexing system of FIG. 15, at 400 press cycles per minute, is estimated to be approximately 480 million cycles or, at 6.5 million cycles per month at 400 press cycles per minute, greater than six years. This is vastly greater than the lives of the Models DIFF30 and B-50ZMV-10 discussed above, in this application. It is believed that the use of an electromagnetic force, rather than a direct mechanical link between a worm gear thread and ring gear tooth, to counteract and absorb the inertial forces exerted by the choke barrel at the beginning and end of each indexing cycle is the reason that this particular phase adjuster embodiment exhibits such improved durability vis-a-vis die assemblies having skewing means including worm gear/ring gear arrangements.

Unlike phase adjusters utilizing worm gear/ring gear arrangements, the electromagnetic force of the servomotor, which maintains the position of its armature, also solely holds the angular position of the differential casing. In the phase adjusters employing worm gearing, the servomotor alone does not hold the position of the differential casing. Indeed, in such systems electromagnetic force may play no significant role at all in holding the angular position of the differential casing. As noted above, it is typical in worm gearing applications that rotation of the (driving) worm gear by the intermeshed (driven) ring gear is prevented by the nearly normal angle of their interface relative to the worm gear's axis of rotation. Thus, in dual action indexing systems utilizing a worm gear/ring gear arrangement for imparting a skew angle, it is the interface between the worm and ring gears which holds the position of the differential casing, and thus absorbs the reversing inertial loads imparted by the rotating choke barrel and differential.

Referring again to FIGS. 2 and 5, fifth timing sprocket 76 is attached to output shaft 64 and is thus rotated by an amount determined by both the indexed rotation of the indexing drive output shaft 56 and the rotation of control shaft 66.

The rotational output of phase adjuster 62 is thereby transferred by third timing belt 78 which engages fifth timing sprocket 76. Third timing belt 78 also engages and controls the position of rotatable choke barrel 80. Third timing belt 78 is tensioned by first and second rotating members, 82 and 84, respectively.

Figure 6:
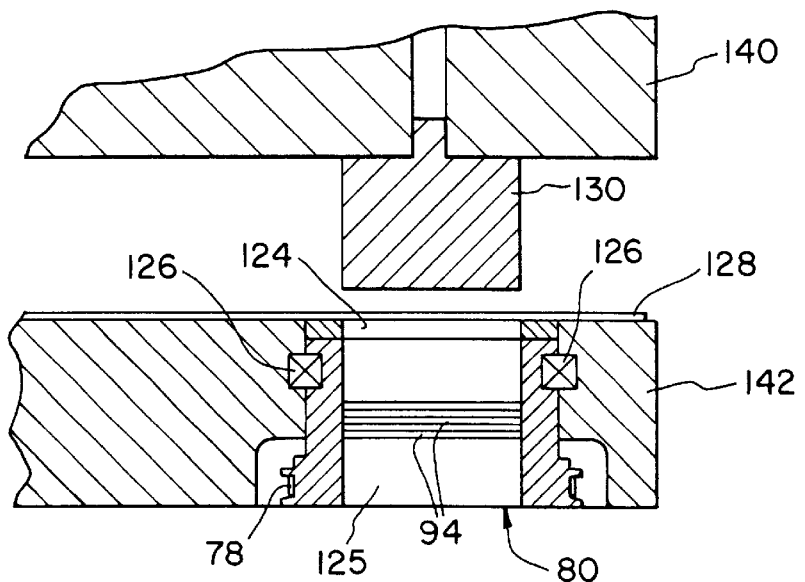
FIG. 6 is a schematic cross sectional view of a rotatable choke barrel.
Figure 5:
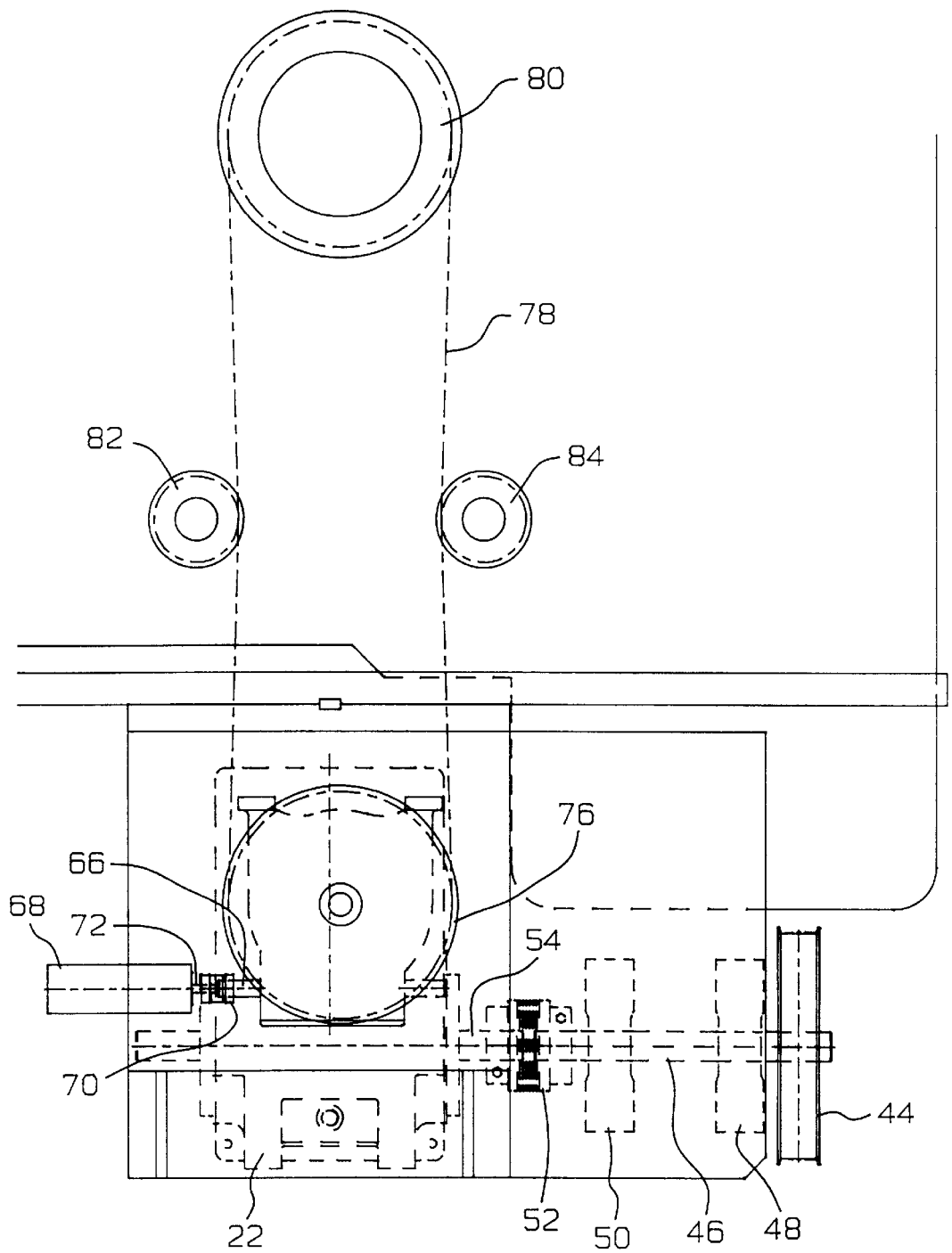
FIG. 5 is a partial plan view of the dual action indexing system.

Choke barrel 80 is shown schematically in FIGS. 5 and 6. Rotatable choke barrel 80 is disposed in lower die block 142 and has choke ring bore hole 125 which extends therethrough. The rotatable choke barrel holds a partial lamina stack comprised of individual laminae 94 which are punched free of strip stock material 128 and into engagement with the uppermost lamina in choke barrel 80 by punch 130. A carbide ring 124 located at the upper periphery of the choke barrel 80 is configured to cooperate with punch 130 in severing the individual laminae 94 from the strip stock material 128. The choke barrel 80 is rotatably supported by bearings 126 and rotated by the action of timing belt 78.

When punch 130 stamps a lamina free of strip stock material 128 during a downstroke of upper die block 140 the choke barrel 80 is at rest, i.e., undergoing a dwell period. After the stamping of the lamina, the choke barrel 80 is rotated by timing belt 78 to provide relative rotation of the individual lamina which will be stamped during the subsequent dwell period and the partial lamina stack held within the choke barrel 80.

As mentioned above, controller 74 is used to regulate the operation of servo drive motor 68. Servo drive motor 68 may be a relatively small motor and is used to rotate phase adjuster input shaft 66 to thereby advance or retard, relative to the rotational movement supplied via input shaft 60, the rotation of choke barrel 84 via phase adjuster 62, output shaft 64, fifth timing sprocket 76 and third timing belt 78. The controller 74 causes servo drive motor 68 to rotate the input shaft 66 in a series of index and dwell periods which are coordinated with the operation of the die assembly. The servomotor is operated such that a dwell period corresponds to each punching operation of the die assembly. Thus, choke barrel 80, which is rotated by the operation of both indexing drive 22 and servo drive motor 68, is at rest during each punching operation of the die assembly. The phase adjuster 62 combines the indexed rotational output of both mechanical indexer 22 and servo drive motor 68 and rotates output shaft 64 in a series of indexed movements which has a dwell period corresponding to each punching operation of the die assembly. The rotational outputs of the servo drive motor 68 and mechanical indexer 22 can occur, and be combined by the phase adjuster, either simultaneously or sequentially so long as both indexed rotational movements are completed before the next punching operation of the die assembly occurs. By having the indexed movements occur simultaneously, the time between die assembly punching operations can be reduced.

The use of a phase adjuster to combine the rotational outputs of both a mechanical indexer 22 and servo drive motor 68 permits the mechanical indexer 22 to provide the relatively large rotational increment necessary to correct for thickness inconsistencies in the strip stock and the servo drive motor 68 to provide the substantially smaller rotational increment necessary to produce a desired skew angle.

The speed of a die assembly is dependent upon a number of variables and, thus, not dependent merely upon the speed of the means employed to rotate the choke barrel. The use of a mechanical indexer to provide the rotational increment necessary to correct for thickness inconsistencies is estimated to allow a typical press punch to operate in the approximate range of 400 to 500 strokes per minute and the use of a small fast servomotor to provide the rotational increment necessary for the skew angle may have the capability of approximately 1,000 cycles per minute. Thus, the combination of a mechanical indexer and small servomotor, as described above, would be likely to permit press speeds in the range of 400 to 500 strokes per minute. This compares favorably to the use of a large servomotor to provide the rotational increments necessary to correct for thickness inconsistencies and to provide for the skew angle. The use of such large servomotors is estimated to permit a typical punch press to operate at an approximate range of 275 to 300 strokes per minute in a similar application, although some designs may permit speeds of up to 400 strokes per minute to be obtained. Thus, the use of a phase adjuster permits the substitution of a relatively fast mechanical indexer and faster, smaller servomotor for a relatively slower, large servomotor. Moreover, the use of a phase adjuster combines the speed advantages of a mechanical indexer with the flexibility and programmability provided by a controller and servomotor combination.

The use of controller 74 to regulate the operation of servo drive motor 68 permits the rotational increment provided by the servo drive motor 68 to be changed without disrupting the operation of the die assembly. Programmable controller 74 has the ability to change the incremental rotational increment provided by servomotor 68 "on-the-fly," without disrupting operation of the die assembly. For example, the rotational input provided by servomotor 68 could be varied between sequential punch press cycles by controller 74 without slowing the operation of the punch press if this were desired. This would be beneficial in the manufacture of a lamina stack in which not all of the laminae are skewed by the same amount. The controller 74 could also be programmed to advance rotation of the choke barrel 80 for some laminations and retard the rotation for other laminations within a single stack and thereby produce a lamina stack having a skew slot with a herringbone shape.

The controller 74 could be also be programmed calculate the necessary rotational increment to be provided by the servo drive motor 68 based upon inputs of a desired stack height, skew angle and lamina thickness. The controller 74 can either be linked to a gauge for measuring the strip stock thickness whereby the thickness measurements would be automatically entered or the lamina thickness inputs may be manually entered by an operator using a keypad 75 connected to the controller 74. The use of controller 74 and servomotor 68 also permits the skew angle to be rapidly and easily altered without significant interruption in the operation of the die assembly, for example, by entering a new skew angle via a keypad. The alteration of the rotational increment provided by a purely mechanical rotational system could not be altered so quickly or easily. Further, controller 74 may also be linked to sensors which allow the controller to "watch" the press position and determine when a window of opportunity is available for for skewing the stack being formed in the choke barrel. These sensors may include a rotary cam switch, a rotary limit switch or a proximity switch for signaling when the press has reached a specific point in its cycle, or an encoder which monitors the press through its entire 360° rotation. The inputs to the controller may vary according to the specific user's preferences, but in any case, the skew angle is calculated dynamically and continuously throughout press operation, allowing the angle to be changed on-the-fly, without interruption of the die stamping process, in response to a variety of measured or manual inputs to the controller. Thus, controller 74 always computes a dynamically changeable set of instructions for varying the frequency and magnitude of servomotor rotation in response to changes in the input(s) to the controller.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An indexing system for a die assembly for manufacturing a stack of laminae from sheet stock material in a punch press, the stack having a desired stack height and a skew angle, the stock material having a nominal thickness, said indexing system comprising:

indexing means for producing a first indexing input movement in response to movement of the punch press;

a motor for producing a second indexing input movement in response to a control signal;

differential means for combining said first and second indexing input movements into an indexing output movement and having first and second input means for respectively receiving said first and second indexing input movements, said first input means being coupled to said indexing means, said second input means being coupled to said motor, said differential means also having output means for transmitting said indexing output movement;

a rotatable choke barrel in which laminae are received and stacked, said choke barrel rotationally coupled to said output means, said choke barrel being rotated in accordance with said indexing output movement; and wherein cyclical inertial loads imparted by said choke barrel are absorbed within said motor.

2. The indexing system of claim 1, wherein said second input means is held in one of a plurality of positions by said motor between subsequent second indexing input movements.

3. The indexing system of claim 1, further comprising an endless driver member extending between said motor and said second input means.

4. The indexing system of claim 3, wherein said second input means is a differential housing and said endless driver member is a flexible timing belt engaged with said housing.

5. The indexing system of claim 4, wherein said timing belt is resilient.

6. The indexing system of claim 4, wherein said housing is provided with a housing sprocket, said timing belt engaged with said housing sprocket.

7. The indexing system of claim 6, wherein said motor is provided with a motor sprocket, said timing belt engaged with said motor sprocket.

8. The indexing system of claim 1, wherein said motor is one of a stepper motor and a servomotor, said motor having a plurality of angular positions at which said motor is stopped between subsequent second indexing movements.

9. The indexing system of claim 1, wherein said cyclical inertial loads imparted by said choke barrel are electromagnetically absorbed by said motor.

10. The indexing system of claim 9, wherein said motor has an armature rotatably coupled to said second input means, said armature being electromagnetically held in one of said plurality of angular positions at which said motor is stopped.

11. An indexing system for a die assembly for manufacturing a stack of laminae from sheet stock material in a punch press, the stack having a desired stack height and, a skew angle, the stock material having a nominal thickness, said indexing system comprising:

an indexer comprising a rotatable output member having a movement which corresponds to movement of the punch press;

a motor comprising a rotatable output member having a movement which is made in response to a control signal;

a differential having first and second rotatable input members and a rotatable output member, the rotational movement of said differential first and second rotatable input members being combined by said differential into the rotational movement of said differential output member, said indexer output member being coupled to said differential first input member, said motor output member being coupled to said differential second input member; and a rotatable choke barrel in which laminae are received and stacked, said choke barrel being rotatably coupled to said differential rotatable output member, whereby rotation of said differential output member causes said choke barrel to rotate;

wherein inertial loading by said choke barrel on said differential second input member is transmitted to, and absorbed by, said motor.

12. The indexing system of claim 11, wherein said differential second input member is a rotatable housing.

13. The indexing system of claim 11, further comprising a flexible coupling member, and wherein said motor output member and said differential second input member are coupled through said flexible coupling member.

14. The indexing system of claim 13, wherein said flexible coupling member is an endless timing belt.

15. The indexing system of claim 11, wherein said inertial loading is electromagnetically absorbed.

16. A method of indexing a rotatable choke barrel, in which laminae punched from sheet stock material are received and stacked, with a differential having rotatable first and second input members and a rotatable output member which is coupled to the choke barrel, whereby the choke barrel is rotated by the differential output member, comprising:

rotating the differential first input member through a first angle;

rotating the differential second input member through a second angle;

combining the rotations of the differential first and second input members into a rotation of the differential output member through a third angle;

rotating the choke barrel between first and second angular positions; and resiliently absorbing at least a portion of the rotational inertia of the choke barrel imparted on the differential as the choke barrel respectively leaves and reaches its first and second angular positions.

17. The method of claim 16, wherein said rotating steps are performed substantially simultaneously.

18. The method of claim 16, wherein the rotation of the differential first input member effects a gamma correction, and the rotation of the differential second input member effects a skew angle, in the laminae stacked in the rotatable choke barrel.

19. The method of claim 18, wherein the differential second input member is rotatably coupled to a motor, and the motor absorbs the rotational inertia of the choke barrel.

20. The method of claim 16, further comprising the step of electromagnetically preventing rotation of the differential second input member while the choke barrel is in its first and second angular positions.

* * * * *